United States Patent [19]
Collins

[11] 4,102,680
[45] Jul. 25, 1978

[54] DEVICE AND METHOD FOR SUPPRESSING ACTIVE SLAG

[76] Inventor: William J. Collins, 7005 Madison St., Merrillville, Ind. 46410

[21] Appl. No.: 764,916

[22] Filed: Feb. 2, 1977

Related U.S. Application Data

[63] Continuation-in-part of Ser. No. 639,469, Dec. 10, 1975, abandoned.

[51] Int. Cl.² .............................................. C04B 7/14
[52] U.S. Cl. ............................................. 75/257; 75/51; 75/53; 75/24; 75/93 G
[58] Field of Search ....................................... 75/51–58, 75/257 (U.S. only), 93 G, 24

[56] References Cited

U.S. PATENT DOCUMENTS

| 1,340,548 | 5/1920 | Lang ................................. 75/53 X |
| 1,794,401 | 3/1931 | Haglund ............................. 75/30 |
| 1,945,260 | 1/1934 | Davies ............................... 75/53 |
| 2,086,756 | 7/1937 | Whitaker ............................ 75/53 |
| 2,416,179 | 2/1947 | Kemmer ............................. 75/53 |
| 2,907,652 | 10/1959 | Anderson ........................... 75/53 |
| 3,723,094 | 3/1973 | Schlatter ............................ 75/53 |
| 3,837,842 | 9/1974 | Tanove et al. ..................... 75/57 X |
| 4,042,410 | 8/1977 | Ito ..................................... 75/53 |

FOREIGN PATENT DOCUMENTS

| 2,051,791 | 4/1971 | France ............................... 75/58 |
| 5,006,406 | 3/1975 | Japan. | |

*Primary Examiner*—M. J. Andrews

[57] ABSTRACT

The subject invention involves providing a device which is utilized to quell, dampen, arrest, deactivate, or minimize an active layer of extremely hot slag on a body of molten metal in a receptacle in a manner whereby the metal can be expeditiously removed from the receptacle.

15 Claims, 9 Drawing Figures

DEVICE AND METHOD FOR SUPPRESSING ACTIVE SLAG

This application is a continuation-in-part of Ser. No. 639,469 filed Dec. 10, 1975 now abandoned.

BACKGROUND OF THE INVENTION

The invention is directed to a device or item to be used for the quelling of the foam action of slag in the basic oxygen process or adjacent vessels which contain molten metal. The word "slag" as employed herein may be considered to be a by-product of the steelmaking process but might have additional application to other types of metals. The relatively recent use of high pressure oxygen to speed the steelmaking process has also occasioned an enormous flow of oxygen bubbles not only into the steel and also into the slag layer or blanket which normally covers it during the melting process to its final composition. The entrapment of the oxygen bubbles, of course, has increased the apparent volume of the slag covering, similar to the froth on a malted milk or foaming glass of freshly poured beer.

In the steelmaking process the time period consumed waiting for the settling of foam in the slag slows down the process. It has become the practice to speedily quell this slag foaming by throwing shovel fulls of salt (NACL) or similar materials to quell the action of the slag and through a gently eruptive process compress the space occupied by the effervescent slag blanket. Regulatory agencies of the federal government such as the Environmental Protection Agency (EPA) and (OSHA) have objected to the by-products of this introduction of salt into the slag on the grounds that it produces noxious fumes and/or other elements which are harmful to the atmosphere and personnel controlling the process.

The device, as disclosed herein, is also intended to reduce the volume of the slag without creating these objectionable fumes or elements that have heretofore occurred through the use of salt, as alluded to above. The device preferably comprises a cylindrical body or tube made out of pasteboard or some similar cellulosic, combustible or burnable material containing a calculated amount of siliceous materials or siliceous aggregate accompanied with a moderate amount of readily ignitible means which may be utilized to promote burning of burnable material.

The device, as presently constructed preferably weighs approximately two pounds, is adapted to be tossed into the mouth of a basic oxygen receptacle, or other vessel at the time when the oxygen lances have been withdrawn with the objective of immediate reduction of the volume occupied by the slag. It may also be used in the adjacent slag thimbles or receptacles which are used to receive slag. Here it performs the same function of reducing the volume of the slag and causes the eruptive discharge of the entrapped oxygen bubbles which are in the slag at that time. It is theorized that the pasteboard or paper laminates afford nothing more than entrapped moisture and offer an avenue for the reaction of the entrapped air to erupt harmlessly into the atmosphere. The contained siliceous aggregate serves to primarily weight the pasteboard tube down to encourage its penetration into the slag blanket to a depth where it will be allowed to work on the surrounding air bubbles and slag and so that the ignitible means will encourage a flame or flames working from the interior of the tube. Caps or closure means at the ends of the tube are known to decompose in the slag and this allows the penetration of the slag with its entrapped oxygen bubbles to work from the inside and thereby encourage reactions simultaneously to promote burning thereof on the outside and inside of the tube. The enclosed siliceous aggregate is released and blends into the slag forming no deleterious chemicals and can be subsequently drained off into vessels provided therefor its final distribution. The caps serve to detain the siliceous material, constituting a weight means in the tube. The device may be designed and constructed in various ways but as presently constructed the use of a combustible or burnable cylindrical tube and sand constituting a weight means has proven to be economical and practical to produce.

OBJECTIVES

In view of the foregoing, an important objective of the subject invention is to provide a device which may be utilized to appreciably reduce the customary activity of a layer of slag on a body of molten metal so that the metal may be dispensed or poured from its receptacle appreciably faster than heretofore and in a safer manner.

In all probability means other than that contemplated herein might be employed to quell the slag but insofar as presently known by Applicant, he is the first to utilize a device which primarily comprises burnable substance, such as a cellulosic material, which carries a generally centrally disposed weight means of a sufficient size to cause at least a portion of the device to sink into the layer of slag so the latter will more or less ignite such portion and in so doing will suppress the activity of the slag.

A particular object of the invention is to provide a device which preferably comprises, among other things, a body, a weight means, and ignitible means. More specifically, the body, as alluded to above, is preferably of a tubular cylindrical character, made from pasteboard and contains a siliceous material, such as sand, to impart sufficient weight to cause the device to penetrate the slag, and ignitible means whereby to expedite burning of the interior of the body when slag is received therein, particularly after some of the sand flows out of the body.

A specific object is to provide a weight means which is preferably of a flowable character so that it may readily adjust itself in the body of the device, and also one which is preferably located at or adjacent to the center of the body to promote balancing of the device so the device will at least tend to lay in a more of less horizontal position in the slag.

An important objective is to provide a method and/or a device which serves to not only expedite removal of molten metal from a vessel by quelling or suppressing the activity of the slag but also serves to expedite removal of the slag from the vessel.

A particularly significant objective of the invention, as to the added subject matter, is to provide a device which comprises a burnable body such as pasteboard having a wax closure and containing salt, sand and sulphur, and in which the approximate percentages of the weight of these materials are respectively 2/3%, 2.5%, 55/60%, 20/25% and 17.5/22.5%.

A very important object is to provide a device of the character set forth in the preceding paragraph in which the wax serves to facilitate burning of the body and propelling the device in a generally serpentine path within the confines of the layer of active slag whereby to promote commingling of the mixture and slag.

Another specific object is to provide a device in which one of the end closures of the device is constructed of a melting plastic and the opposite closure comprises a mass of ignitable wax.

Other objects of the invention reside in providing a device which has proven efficient for the use intended and comprises a minimum number of components or parts which can be economically manufactured and assembled on a production basis.

Additional advantages or objects of the invention will become apparent after the description hereinafter set forth is considered in conjunction with the drawings annexed hereto.

DRAWINGS

DESCRIPTION

Figure 1:
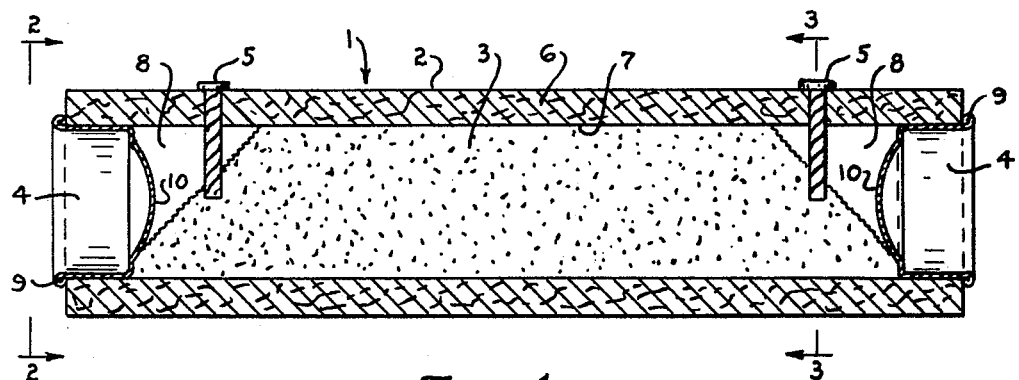
FIG. 1 is a horizontal sectional view of a device embodying the invention.
Figure 2:
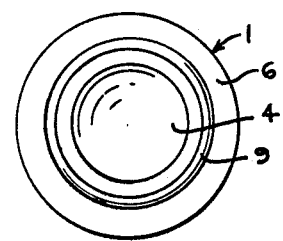
FIG. 2 is one end view of the device, looking in the direction of the arrows 2 — 2.
Figure 3:
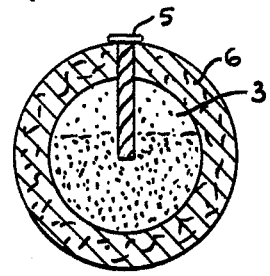
FIG. 3 is a transverse section taken substantially on line 3 — 3 of FIG. 1, looking in the direction of the arrows.
Figure 4:
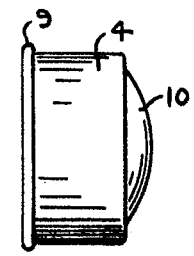
FIG. 4 is an elevational view of one of a pair of caps or means which serve to detain a siliceous material in a body of the device.

Referring to FIG. 1 of the drawing there is disclosed a device generally designated 1, which preferably comprises a body 2, weight means 3, a pair of closures or means 4, and a pair of ignitible means 5.

More particularly, the body is preferably of a tubular cylindrical character and constructed of laminated pasteboard. This body has a cylindrical wall 6 of uniform thickness which defines a chamber 7 having end openings 8 which communicate with the chamber. Otherwise expressed, the chamber is open-ended and the closures or means 4 normally close the openings, the purpose of which is to retain the weight means 3 in the chamber 7. The body may be constructed in any shape, form, or size and from any material desired which is suitable for the purpose. The body disclosed herein is preferably of a length in the neighborhood of two feet, has an outside cross-dimension in the neighborhood of two inches, and preferably comprises a burnable or combustible substance which will progressively lose its identity when located in hot slag.

The weight means 3 may be made of any material suitable for the purpose but as disclosed it is preferably of a flowable character and comprises a siliceous material, such as sand, which is disposed in the chamber in a sufficient quantity or weight, preferably two pounds, so that it will automatically adjust itself throughout the major length of the chamber or body, the purpose of which is to cause the device to penetrate or sink into the slag a sufficient depth to cause prompt ignition or burning of the body and concurrently cause the device to, more or less, lay in a prone or horizontal position so that a large external area of the body is subjected to the slag. As noted above, at least a portion of the weight means is located at or adjacent to the center of the device whereby to impart balance thereto.

The pair of closures or means 4 are substantially identical and may be made of any material suitable for the purpose and as disclosed herein they are preferably in the form of hollow metal cylindrical plugs having outside diameters or cross-dimensions which will cause the plugs to be automatically held in place when press-fitted into the end openings 8 of the chamber. The plugs may be provided with rims or abutments 9 which serve to engage the ends of the body and thereby limit their entry into the chamber and so that inner ends 10 of the plugs are inset with reference to the marginal ends of the body, the purpose of which is to allow some of the hot slag to more or less immediately enter the body to promote disintegration of the plugs and expedite the burning process.

Figure 7:
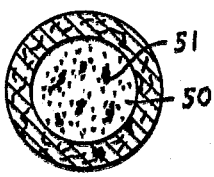
FIG. 7 is a transverse section taken through a device showing a highly ignitable substance interspersed in a siliceous material.

The pair of ignitible means 5 may be constructed of any material and shape suitable for the purpose and as depicted these means are preferably in the form of headed elements of aluminum or magnesium which are driven transversely through the wall of the body into the chamber at locations adjacent its extremities. If desired holes may be provided in the body to facilitate entry of the elements. These elements promptly ignite when contacted by the slag and serve to promote interior burning of the body. If found desirable, the means or plugs 4 can be made of an ignitible material to promote combustion, in which event, the means 5 can still be utilized or omitted. Also, if found desirable, the ignitible means may be of such a character that it can be interspersed or combined with a weight means 50 as depicted in FIG. 7. More specifically in this respect, and for example, small pieces or particles of scrap magnesium identified as 51 may be utilized for this purpose.

Figure 5:
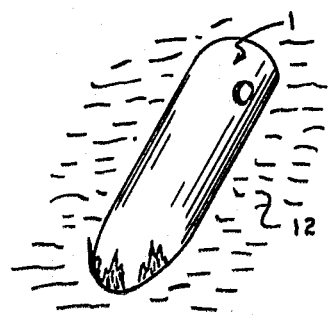
FIG. 5 is a view showing a device which has penetrated a layer of slag on a mass of molten metal.
Figure 6:
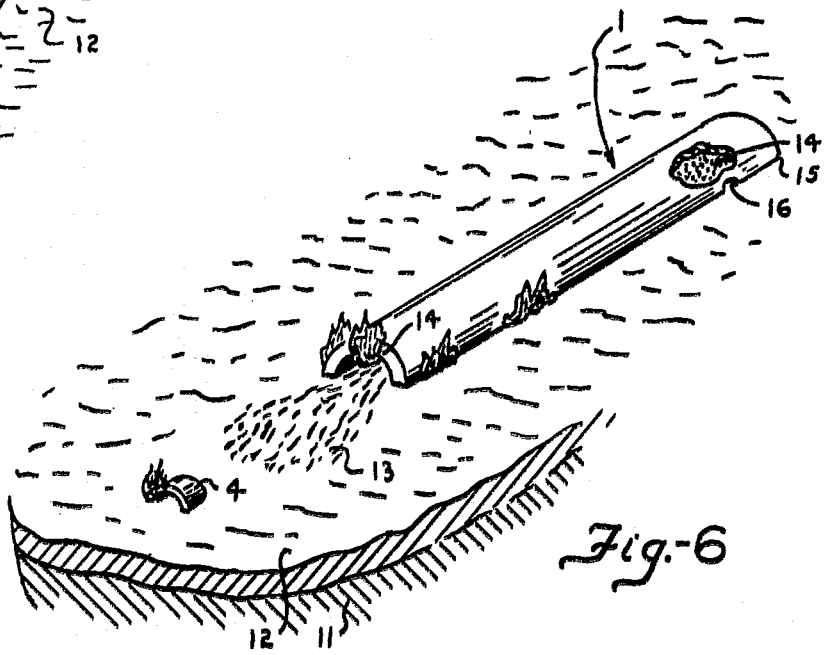
FIG. 6 is a view showing a device which is more or less disposed in an operative position in a layer of slag.

In view of the foregoing, the device 1 is utilized by introducing it into a vessel containing a body of molten metal 11 having a layer of active slag 12 thereon as substantially exemplified in FIGS. 5 and 6. In some instances, the device upon being introduced into a vessel may initially penetrate the slag and temporarily assumes a more or less upstanding position therein as shown in FIG. 5 and subsequently automatically adjusts itself to a substantially prone or horizontal position as depicted in FIG. 6, particularly since the weight means 3 is well distributed throughout a major portion of the length of the device to cause a relatively large area of the body to be subjected to the slag.

After the device is located in the slag, the closures 4 will either successively or simultaneously melt or disintegrate into the slag and thereby allow some of the slag to enter the chamber 7 as indicated by the arrow at 13 in FIG. 6 and thereby cause some burning or combustion of the body's interior as indicated at 14 and this interior combustion is promoted or expedited by the ignitible means 5 which is promptly ignited by the hot slag. After the means 5 disintegrate, holes 15 (one shown) are left which provide vents through which at least some of the weight means 3 may automatically flow outwardly from the chamber 7 into the slag as indicated at 16 whereby to allow the chamber to accommodate more slag to accelerate burning of the body. Obviously, some of the sand flows out of the ends of the tube and some slag flows in. This external and internal burning or combustion of the body, as set forth above, serves to quell or suppress the activity of the slag and particularly in the area about the device so that the slag and/or the molten metal can be more rapidly removed from the vessel or vessels containing the same. The device as presently utilized has proven very efficient for the purpose intended and the materials of which its components are constructed either disintegrate or more or less diffuse into the slag and have no deleterious affect on the molten metal, particularly since the device is embedded only in the slag. It should be apparent that one or a multiplicity of the devices may be utilized in a vessel, and the number employed will depend on variable conditions, such as for example, the amount of molten metal and/or slag in a vessel or vessels.

Figure 8:
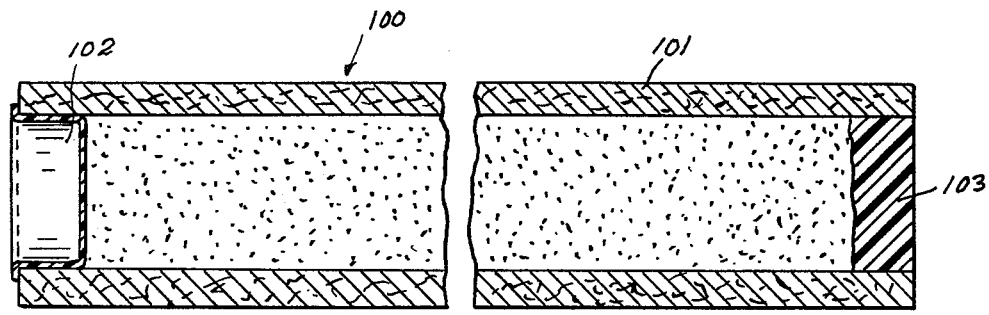
FIG. 8 is a view similar to FIG. 1 illustrating a modified device.
Figure 9:
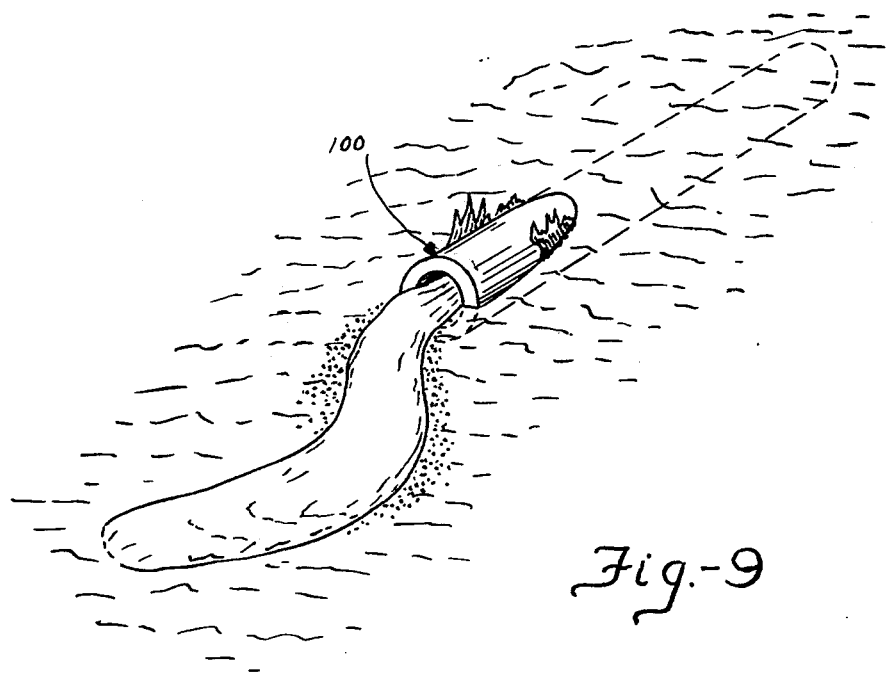
FIG. 9 is a pictorial view depicting a generally serpentine movement of the device of FIG. 8 substantially within the confines of a layer of active slag.

A modified device, generally designated 100, exemplified in FIGS. 8 and 9, comprises a burnable body 101 substantially corresponding to the body 2, above referred to, and contains sulphur in addition to sand and salt, and one end is sealed by a closure 102, preferably constructed of a meltable plastic, and its opposite end is sealed by a mass or plug of inflammable wax 103. After the closure 102 is fitted into the body and the latter is filled with the mixture and stood upright the wax in a molten condition is poured into the top of the body and allowed to solidify. The thickness of the wax closure is preferably ¼ inch but this dimension may be varied. The approximate percentages of the weight of the materials are respectively as follows: body 2/3%, wax 2.5%, salt 55/60%, sand 20/25% and the sulphur 17.5/22.5%.

The structure of the device 100 is preferably such that when immersed in a layer of active slag, the body 101 will begin to burn and disintegrate and the wax will not only expedite this burning but serves as a propelling agent to cause the device to more or less move in a serpentine, curved, or irregular path within the confines of the layer of active slag as generally exemplified in FIG. 9 of the drawing: This motion of the device imparted to it by the wax assists in commingling the mixture and slag within the confines of the layer of slag. The wax after melting allows some of the slag to flow into the body while the latter is burning. It is intended that the plastic closure 102 will melt or disintegrate after the wax melts so that some slag may also flow into the body from its opposite end and a complete disintegration of the body will allow for a substantially complete commingling of the mixture and slag and a partial or advance commingling will occur when one or both closures disintegrate and/or when a break occurs in the wall of the body.

In view of the foregoing and according to the inventor:

"The inclusion of sulfur and salt in the contents of the device recognizes the ability of each to change the texture of the slag to enable the release of the entrapped oxygen and other gases. The chemical reaction of each with the entrapped gases almost instantaneously reduces the volume of the gaseous slag. The insulation provided by the cardboard allows this reaction to occur within the slag itself rather than a discharge into the atmosphere discernible by superficial infringement of either of these elements onto the surface of the slag.

Essentially the novelty of the invention is the ability of the device to introduce the elements into and within the slag rather than at the surface subject to the slag's expulsion effect into the atmosphere.

The wax closure not only serves to expedite entry of the molten slag into the contained aggregate or mixture of the device but acts as a propelling agent to propel or move the device in a generally serpentine, curved, or irregular path within the confines of the layer of slag and not in the mass of molten metal or material which supports the layer of slag. Both of these actions increase the efficiency of deoxidization in the slag and quells its activity."

The use of the words sand, salt and sulphur utilized in the mixture contained in the body of the device are intended to be used in their common or ordinary sense. In other words, the sand or weight means preferably employed is a hard, granular comminuted rock material finer than gravel and coarser than dust. The weight means currently used may also be referred to as beach or dune sand. The sulphur employed is of the ordinary or rhombic character or otherwise substantially pure.

Having thus described my invention, it is to be understood that various modifications may be made in the same without departing from the spirit of the invention, and therefore I do not wish to be limited to the exact disclosures made in the subject application.

I claim:

1. A method which comprises filling a hollow burnable cellulosic body with a mixture of silaceous sand, elemental sulfur and sodium chloride, confining this mixture in the body to provide a unitary device, and then immersing the device into a layer of active slag on a body of molten material whereby to release gases from the slag and thereby quell the activity of the slag.

2. A device comprising a body containing a mixture of sand, salt and elemental sulfur for immersion in a layer of active slag on a body of molten material for deactivating the slag.

3. A device comprising a body containing a mixture of silaceous material, salt and elemental sulphur for immersion in a layer of active slag on a body of molten material for deactivating the slag.

4. A device comprising a hollow burnable body of cellulosic material having an opening, a mixture of siliceous material and sodium chloride disposed in said body, an ignitable propellant closing said opening for confining said mixture in said body, said device being so structured that when it is substantially immersed in a layer of active slag on a mass of molten metal said body will burn and said propellant will ignite and propel said device in said layer and so that said slag and mixture will commingle as the device deteriorates whereby to quell the activity of said slag.

5. The device defined in claim 4, in which sulphur constitutes an ingredient of said mixture.

6. The device defined in claim 4, in which said body is provided with another opening which is closed by a closure assisting to confine the mixture in said body and which upon deterioration will allow commingling of the mixture and slag.

7. A device comprising an elongated tubular burnable body, a mixture of sand, salt and sulphur disposed in said body, a plastic closure secured at one end of said body and a mass of ignitable wax closing the opposite end of said body for confining said mixture therein, said device being so structured that when it is substantially immersed in a layer of active slag supported on a body of molten metal said device will be caused to move in said layer and upon deterioration will effect a commingling of said mixture and slag for quelling the latter.

8. A method of quelling a layer of active slag on a body of molten metal which comprises filling a hollow burnable body with a mixture of sand, salt and sulphur, providing the body with an ignitable substance, and subsequently substantially immersing the body, mixture and substance as a unit into such a layer whereby said substance will propel said unit and so that said slag and mixture will commingle when the unit deteriorates sufficiently to release said mixture.

9. A device for quelling slag comprising an elongated tubular open ended body of burnable substance constructed to provide a chamber, a flowable mixture of silaceous sand, sodium chloride and elemental sulphur arranged in said chamber, and separate means closing the ends of said body for retaining the mixture in said chamber.

10. A device for use in an active layer of slag comprising: a burnable body having a chamber and at least one opening communicating with the chamber, a flowable mixture of silaceous sand, sodium chloride, elemental sulphur and ignitable means disposed in said chamber, expendable means normally closing said opening for detaining said mixture in said chamber, the construction and arrangement being such that when the device is located in the slag the external surfaces of the body will burn and the expendable means will disintegrate and release some of the mixture and allow some of the slag to enter and burn the interior of the chamber, all for the purpose of quelling the activity of the slag.

11. A method which comprising locating a burnable body of pasteboard carrying a flowable mixture of silaceous sand, sodium chloride and elemental sulphur in a layer of active slag on a mass of molten metal in a receptacle whereby to cause at least a portion of the body to burn and release the mixture and thereby suppress the activity of the slag about the body so that the metal can be expeditiously removed from the receptacle.

12. A method which comprises filling a burnable body with silaceous sand, sodium chloride and elemental sulphur to obtain a weight of approximately two pounds, confining the aforesaid materials in said body to provide a unitary device, and then immersing this device into a layer of active slag on a body of molten material for releasing gases in the slag to thereby modify the texture of the slag in order to reduce the volume thereof.

13. A device comprising a burnable body containing a mixture of silaceous sand, sodium chloride and elemental sulphur for immersion in a layer of active slag on a body of molten material for deactivating the slag.

14. The device defined in claim 13, in which said body is a laminated structure and metallic ignitable means is interspersed in the sand.

15. The device defined in claim 13, in which the percentages of the material of said body, silaceous sand, sodium chloride and elemental sulphur are respectively approximately 2/3%, 20/25%, 55/60%, and 17.5/22.5%.

* * * * *